United States Patent Office 3,397,035
Patented Aug. 13, 1968

3,397,035
AMMONIUM POLYPHOSPHATES
Chung Yu Shen, St. Louis, Mo., and Norman Earl Stahl-heber, Columbia, Ill., assignors to Monsanto Company, St. Louis, Mo., a corporation of Delaware
No Drawing. Filed Dec. 22, 1964, Ser. No. 420,459
18 Claims. (Cl. 23—106)

ABSTRACT OF THE DISCLOSURE

A process is described for preparing a substantially water-insoluble crystalline ammonium polyphosphate by thermally condensing a phosphate containing material, an ammoniating agent and a condensing agent in the presence of an additive of a substantially water-insoluble crystalline ammonium polyphosphate, the additive being present in amounts of at least 1 part per 10 parts, by weight of the reactants and the thermal condensation conducted at temperatures of from about 100° C. to about 350° C. for a time sufficient to convert the reactants to a crystalline ammonium polyphosphate.

---

This invention pertains to ammonium polyphosphates and to improved processes for preparing ammonium polyphosphates. More particularly, this invention pertains to improvements in preparing substantially water-insoluble crystalline ammonium polyphosphates as well as to new and novel crystalline forms of such polyphosphates.

In preparing substantially water-insoluble crystalline ammonium polyphosphates by the thermal condensation of a suitable phosphate containing material, such as monoammonium orthophosphate, with an ammoniating and condensing agent, such as urea, the polyphosphate products formed contain a substantially water-insoluble fraction and a relatively water-soluble fraction. The formation of the water-soluble fraction, of course, results in a lowering of the yield of the desired water-insoluble fraction and it is oftentimes necessary to remove the water-soluble fraction from the composition by such methods as water-leaching and the like in order to obtain the desired water-insoluble fraction with a desired degree of purity. Additionally, the thermal condensation reaction has been found to be difficult to control and handle due to, among other things, the degree of gas evolution and foaming which takes place during the reaction. Further, it is oftentimes advantageous to prepare the crystalline ammonium polyphosphate in a desired crystalline form. As can be appreciated, therefore, a method for preparing substantially water-insoluble crystalline ammonium polyphosphates in high yields, that is, without an appreciable water-soluble fraction, as well as in a desired crystalline form and in an improved manner would represent an advancement in this art.

It is, therefore, an object of the present invention to provide an improved process for preparing substantially water-insoluble crystalline ammonium polyphosphates.

It is a further object of the present invention to provide a process for preparing substantially water-insoluble crystalline ammonium polyphosphates in improved yields.

It is a further object of the present invention to provide improved process conditions for preparing substantially water-insoluble crystalline ammonium polyphosphates.

It is a still further object of the present invention to provide a process of preparing crystalline ammonium polyphosphate in a desired crystalline form.

It is a still further object of the present invention to provide new and novel crystalline ammonium polyphosphates.

These and other objects will become apparent from the following detailed description.

It has now been found that substantially water-insoluble crystalline ammonium polyphosphates can be prepared in high yields, that is, without appreciable quantities of a water-soluble component, as well as in a desired crystalline form and in an improved manner, by thermally condensing a composition comprised of a phosphate containing material, an ammoniating agent and a condensing agent in the presence of the desired crystalline ammonium polyphosphate additive, that is, the substantially water-insoluble ammonium polyphosphate in the crystalline form which is desired, all of which will be more fully discussed hereinafter.

Typical compositions comprised of a phosphate containing material, an ammoniating agent and a condensing agent useful in the present invention are those which, in general, can, by thermal condensation, polymerize into crystalline ammonium polyphosphates which are substantially water-insoluble. The compositions may be mixtures, addition compounds or double salts, or reaction products and such can be in the liquid form, such as a melt, or a solid form, such as a crystalline form or an amorphous granular or powder form, that is, those forms exhibiting little or no crystalline structure as evidenced by an X-ray diffraction pattern.

In general, to prepare ammonium polyphosphates by the thermal condensation reaction of the present invention there should be at least enough of the ammoniating agent present to supply about 1 mol of ammonia per mol of phosphorus present, and, in addition, enough ammoniating agent present to provide the desired ammonia concentration in the vapor phase over the reactants. Also, the condensing agent should be present in amounts to insure essentially quantitative removal of all water present or formed in the system, except for any water of constitution remaining in the reaction product.

Typical phosphate containing materials include those containing or yielding by hydrolysis at least one phosphate radical ($PO_4\equiv$) which are capable of being thermally condensed with the ammoniating agent and the condensing agent to form an ammonium polyphosphate. Such materials include monoammonium orthophosphate, diammonium orthophosphate, triammonium orthophosphate, orthophosphoric acid, condensed phosphoric acid, phosphorus pentoxide, phosphorus oxyhalides, such as phosphorus oxybromide and phosphorus oxychloride, and the like including mixtures of the foregoing.

Condensed phosphoric acid is a phosphoric acid containing any quantity of one or more polyphosphoric acids and/or metaphosphoric acids and any such acid can be employed in this invention. The polyphosphoric acids include pyrophosphoric acid and other polymers from the tri- to the nonapolymer and higher. The properties and compositions of the condensed phosphoric acids vary with the $P_2O_5$ content of the condensed phosphoric acid as discussed in Van Wazer, Phosphorus and Its Compounds, Interscience Publishers, Inc. New York, N.Y., volume 1 (1958), and shown by Table 12–1, page 748. Although, in general, for the instant invention any condensed phosphoric acid is suitable as the acid source, the preferred condensed phosphoric acids are liquid mixtures ranging from about 72 percent $P_2O_5$ by weight which contains about 89.4 percent orthophosphoric acid and 10.6 percent pyrophosphoric acid to about 88 percent $P_2O_5$ by weight which contains about 1.3 percent orthophosphoric acid, 1.8 percent pyrophosphoric acid, 2.4 percent tripolyphosphoric acid, and about 94 percent of polyphosphoric acids polymers higher than tripolyphosphoric acid.

Typical of the ammoniating agents which are suitable for use in the instant invention are those agents which are capable of supplying or releasing ammonia under the conditions of the thermal condensation reaction and which include such agents as ammonia gas, liquid ammonia, inorganic ammonium salts containing non-oxidizing anions, such as, halides, $CO_3^{2-}$, $S^{2-}$ and the like, which include such compounds as ammonium carbonate, ammonium bicarbonate, ammonium chloride, ammonium fluoride, ammonium sulfide and the like, ammonium hydroxide, hydroxy amine chloride, hydroxy amine fluoride, monoamminium orthophosphate, diammonium orthophosphate, triammonium orthophosphate, ammonium pyrophosphates, urea phosphate and the like including mixtures of the foregoing.

Typical of the condensing agents which are suitable for use in the instant invention are those which are capable of keeping the reaction system sufficiently dry during the thermal condensation reaction by removing the water in one form or another from the system and which include such agents as phosphorus pentoxide, phosphorus oxyhalides, such as phosphorus oxychloride and phosphorus oxybromide, urea phosphate, phosphorus penthahalides, such as phosphorus penetrabromide, and phosphorus pentachloride, and the like including mixtures of the foregoing.

In addition to the foregoing ammoniating and condensing agents, there can also be used a combined ammoniating and condensing agent, that is, a material which is capable of functioning either as an ammoniating agent or a condensing agent or as both an ammoniating and condensing agent. The combined ammoniating and condensing agent can be used either alone or with other ammoniating agents and/or condensing agents.

Typical of the combined ammoniating and condensing agents which are suitable for use in the instant invention are those nitrogenous compounds which are capable of releasing ammoniacal nitrogen and condensing with the phosphorus-containing materials under the conditions of the thermal condensation reaction described herein. In particular are the nitrogeneous compounds containing one or more amide groups, i.e., a compound resulting from replacement of one or more atoms of hydrogen in ammonia by univalent acid radicals, and particularly the primary amides, and containing the elements carbon and/or sulfur, nitrogen, oxygen and hydrogen as well as containing no carbon-carbon bonds. Preferably the compounds are non-cyclic structures and there are few if any, compounds which contain 3 or more amide groups which can be used in practicing the present invention. Especially preferred are low molecular weight nitrogeneous compounds, i.e., having a molecular weight below about 200, and containing at least one but no more than 2 of the following radicals: carbamyl, carbamic, sulfamino, sulfamyl and ureido. As being illustrative of such compounds are urea, ammonium carbamate, biuret, sulfamide, sulfamic acid, ammonium sulfamate, guanyl urea, methyl urea, formamide, amino urea, 1-3-di-amino urea, biurea and the like with urea, because of its relative inexpensiveness and ready availability, being particularly preferred.

As being illustrative of some of the foregoing types of reactants which can be used to prepare the substantially water-insoluble ammonium polyphosphates (APP) by thermal condensation the following equations are set forth:

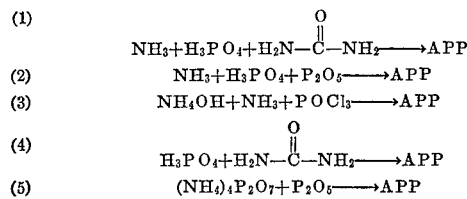

As can be appreciated from the foregoing, the individual reactants can function in some instances in a dual capacity, that is, as both a phosphate containing material and an ammoniating agent, as both a phosphate containing material and a condensing agent, or as a combined ammoniating and condensing agent. Preferred reactants for use in the present invention are the combined ammoniating and condensing agents as described hereinabove and the phosphate containing materials selected from the group consisting of the ammonium orthophosphates, that is, the mono-, di-, and tri- ammonium orthophosphates, orthophosphoric acid, condensed phosphoric acid and mixtures thereof.

The compositions disclosed and described hereinafter are intended to be further illustrative of the preferred compositions which can be used in the process of the present invention.

One composition which can be used in preparing substantially water-insoluble ammonium polyphosphates is comprised of condensed phosphoric acid and a combined ammoniating and condensing agent. In general, it is usually only necessary to add the combined ammoniating and condensing agent to the condensed phosphoric acid, preferably admixing the reactants, and heating the admixture for the thermal condensation reaction to take place. Usually amounts of the combined ammoniating and condensing agent and condensed phosphoric acid between about 1 to about 5 on a nitrogen to phosphorus molar ratio basis of reactants are suitable with a molar ratio of between about 1 and about 3 being preferred.

Another composition which can be used in preparing substantially water-insoluble ammonium polyphosphates is comprised of orthophosphoric acid and a combined ammoniating and condensing agent. Usually, any concentration of orthophosphoric acid can, in general, be used although it is preferred that concentrations above about 40% by weight be used and particularly preferred are concentrations of about 85% and higher. In general, it is usually only necessary to add the combined ammoniating and condensing agent to the orthophosphoric acid, preferably admixing the reactants, and heating the admixture for the thermal condensation reaction to take place. As was applicable when using the condensed phosphoric acid as a reactant as hereinabove described, amounts of reactants between about 1 to about 5 on a nitrogen to phosphorus molar ratio basis are suitable with a molar ratio of between about 1 and about 3 being preferred. Since orthophosphoric acid can contain water and since water in the product has deleterious effects on the product obtained from the thermal condensation it may be necessary in some cases to prevent or minimize the possibility of water in the reaction product by using excess amounts of the combined ammoniating and condensing agent in order to remove the water by hydrolysis.

A further composition which can be used in preparing substantially water-insoluble crystalline ammonium polyphosphates is comprised of a product of a phosphate containing material, such as phosphoric acid, and a combined ammoniating and condensing agent, such as urea, that is, urea-phosphate, which is believed to be an addition compound or salt, with a combined ammoniating and condensing agent, such as urea. In general, it is usually only necessary to admix the urea-phosphate and urea and heat such a mixture for the thermal condensation reaction to take place. Usually amounts of the combined ammoniating and condensing agent and the addition compound between about 0.5 to about 2 on a nitrogen (from the combined ammoniating and condensing agent) to phosphorus (from the addition compound) molar ratio basis of reactants are suitable, with a molar ratio of from about 1 to about 2 being preferred.

A still further composition which can be used in preparing substantially water-insoluble crystalline ammonium polyphosphates is comprised of ammonium phosphate salts, i.e., monoammonium orthorphosphate, diammonium orthophosphate, triammonium phosphates, and mixtures thereof, and a combined ammoniating and condensing agent. In general, it is usually only necessary to admix the ammonium phosphates and the combined ammoniating and condensing agent and heat such a mixture for the thermal condensation reaction to take place. Usually amounts of the combined ammoniating and condensing agent and ammonium phosphates between about 1 to 7 on a nitrogen (from the combined ammoniating and condensing agent) to phosphorus (from the ammonium orthophosphate) molar ratio basis of reactants are suitable, with a molar ratio of between about 1 and about 3 being preferred.

The substantially water-insoluble crystalline ammonium polyphosphates prepared by the process of the instant invention are polymeric polyphosphates, i.e., those compounds having a P-O-P type linkage, having the general formula $$H_{(n-m)+2}(NH_4)_m P_n O_{3n+1}$$

wherein $n$ is an integer having an average value greater than 10 and $m/n$ is between about 0.7 and about 1.1 and the maximum value of $m$ is equal to $n+2$. The average value of $n$ being greater than 10 is evidenced by the paper chromatography method [Karl-Kroupa, Anal. Chem. 28, 1091 (1956)], and the polymeric P-O-P type linkage is evidenced by N.M.R. spectra which indicates substantially no P-N-P type linkages and no ortho, pyro or short chain P-O-P type groups and by infra-red spectra which indicated P-O-P type linkages but does not indicate substantially any P-N type linkages.

These polymeric compounds can be either straight chain structures or branched chain structures. It should be noted that substantially all of the nitrogen in these compounds is present as the ammoniacal nitrogen and there is substantially no nuclear nitrogen present in the compounds. Although theoretically the ammoniacal nitrogen to phosphorus molar ratio for the compounds of the instant inventoin is about 1, i.e., $$\frac{m+2}{n}$$

with $m=n$, when the compounds are completely ammoniated, in some cases the molar ratio of ammoniacal nitrogen to phosphorus is less than 1 and it is intended that this invention pertains to those polymeric ammonium polyphosphates having a molar ratio of not less than about 0.7. In addition, when the compounds of the instant invention are characterized herein as being substantially water-insoluble it is intended to mean that the solubility of a slurry of 10 grams of solids/100 cc. of water at 25° C. is about 5 grams/100 cc. of water or less.

The term "ammoniacal nitrogen" refers to that nitrogen which is present in the form of ammonium ions and is capable of being removed by the hydrogen form of a strong cation exchange resin, i.e., the hydrogen form of a sulfonate polystyrene resin. The term "non-ammoniacal nitrogen" or "nuclear nitrogen" refers to nitrogen incapable of being removed in the manner of true ammonium nitrogen.

The substantially water-insoluble ammonium polyphosphates can be prepared by the process of the instant invention exhibiting many different crystalline forms as evidenced by their X-ray diffraction patterns. As being tially water-insoluble it is intended to means that the solutially water-insoluble ammonium polyphosphates the following X-ray diffraction patterns are set forth.

X-RAY DIFFRACTION DATA [1]

| Line [2] | d, A. | | | |
|---|---|---|---|---|
| | Form 1 | Form 2 | Form 3 | Form 4 |
| 1 | 6.06 | 5.70 | 6.65 | 5.70 |
| 2 | 5.47 | 6.06 | 5.68 | 5.60 |
| 3 | 3.83 | 3.08 | 5.40 | 3.42 |
| 4 | 3.50 | 2.93 | 3.52 | 7.00 |
| 5 | 3.24 | 3.37 | 3.80 | 6.10 |

[1] CuK α radiation.
[2] Five strongest lines in order of decreasing intensity.

The compounds of the instant invention, i.e. substantially water-insoluble crystalline ammonium polyphosphates, are useful for a number of different applications which include their usefulness as fire-retardants in many different applications, such as plastics, textiles and paint compositions. In addition, the compounds are useful as builders in synthetic detergent compositions, especially such compositions containing anionic surface-active agents, nonionic surface-active agents and mixtures thereof. They are also useful as fertilizer materials.

As previously mentioned, the composition comprised of a phosphate containing material, an ammoniating agent and a condensing agent is thermally condensed in the presence of the desired crystalline ammonium polyphosphate additive in order to prepare substantially water-insoluble crystalline ammonium polyphosphates in an improved manner. Therefore, in order to prepare an ammonium polyphosphate of a desired crystalline form, such as, for example, Form 1, it is necessary to use as the ammonium polyphosphate additive the same crystalline form, that is, Form 1.

In general, the thermal condensation, that is the polymerization of the composition into P-O-P linkage type polymers with concomitant loss of gases as a result of the polymerization, can be carried out by heating the composition in the presence of the desired crystalline ammonium polyphosphate additive at temperatures from about 100° C. to about 350° C. and preferably from about 200° C. to about 300° C.

In general, the times necessary to produce the desired product are dependent on the temperatures used with higher temperatures requiring shorter periods of time for substantially complete conversion of the composition into the desired ammonium polyphosphates. Depending upon, inter alia, reactants used, type of process used, desired degree of improvement and the like as well as the degree of subdivision of the ammonium polyphosphate additive, uniformity of distribution of the additive throughout the reaction mass, various amounts of the substantially water-insoluble ammonium polyphosphate additive can be used in the thermal condensation reaction. In general, at least 1 part of the additive for every 10 parts by weight of the composition is needed before any improvements can be achieved according to the instant invention. Usually for a batch type method weight ratios of additive to composition from about 1:10 to 2:1 are sufficient although weight ratios greater than 2:1, that is as high as 5:1 and even higher can be used. For methods such as a continuous recycle method weight ratios of additive to composition of from about 20:1 to about 50:1 are suitable although weight ratios greater than 50:1, that is, as high as 100:1 and even higher can be used.

Various methods can be used to carry out the thermal condensation reaction depending upon, inter alia, type of composition used, conditions used and the like. Illustrative of one method is the batch method wherein monoammonium orthophosphate is used as the phosphate containing material and urea is used as the combined ammoniating and condensing agent. The monoammonium orthophosphate and urea are intimately blended together with about an equal amount on a weight basis of granular substantially water-insoluble ammonium polyphosphate of the desired crystalline form. These materials are charged to an oven and heated at about 300° C. in a closed atmosphere for periods of time sufficient to convert the composition into the desired crystalline ammonium polyphosphate which usually takes from about 1 to 4 hours. The ammonium polyphosphate is removed from the oven, air-cooled, and milled. Part of this material may be recycled back to the oven as the ammonium polyphosphate additive, if desired. Although the foregoing has been described with respect to monoammonium orthophosphate and urea, other compositions can be used in the batch method which include the aforedescribed compositions comprised of a combined ammoniating and condensing agent with ortho- or condensed phosphoric acids and the like.

As illustrative of another method is the continuous method wherein orthophosphoric acid is used as the phosphate containing material and urea is used as the combined ammoniating and condensing agent. These materials are heated together to form a melt in proportions as hereinbefore described. The melt is then sprayed onto a hot recycle bed of the additive, that is, substantially water-insoluble ammonium pholyphosphate granules of the desired crystalline form, on a weight ratio of additive to melt of about 30:1. The hot ammonium polyphosphate bed is used to supply some of the heat necessary for thermally condensing the melt and renders such as handleable solids. The bed is then passed through an indirect-fired calciner where the thermal condensation can be completed with the bed temperature at about 300° C. During the calcination an ammonia atmosphere is preferably maintained over the bed. The off-gases are either discarded or recovered for re-use. A portion of the product is then cooled and milled for its intended use, while the remaining portion is recycled. Although the foregoing has been described with respect to a composition comprised of orthophosphoric acid and urea, other compositions can be used in the continuous method which include the aforedescribed composition comprised of the combined ammoniating and condensing agent and condensed phosphoric acid as well as the aforedescribed composition comprised of the combined ammoniating and condensing agent and monoammonium orthophosphate and/or diammonium orthophosphate.

The following examples are presented to still further illustrate the invention, with parts and percentages by weight being used in the examples unless otherwise indicated.

EXAMPLE I

Mixtures of monoammonium orthophosphate (MAP) and urea in various molar ratios as indicated were heated in an oven maintained at a temperature of about 260° C. for about 30 minutes in the presence of as well as the absence of substantially water-insoluble ammonium polyphosphate (APP) additive exhibiting crystalline Form 1. The following table sets forth the results:

TABLE 1

| Urea:MAP Ratio | Percent APP Present | Percent Solubles [1] |
| --- | --- | --- |
| 1.00 | 0 | 3.4 |
| 1.05 | 0 | 3.2 |
| 1.20 | 0 | 5.8 |
| 1.00 | 50 | 1.6 |
| 1.05 | 50 | 1.3 |
| 1.20 | 50 | 2.8 |

[1] Percent solubles in slurry of 10 grams of APP in 100 gr. $H_2O$, 1 hour at 25° C.

As can be observed from the above table, the process of the instant invention gave a product containing a much less quantity of the soluble fraction as evidenced by the percent solubles than the process of thermally condensing the urea and MAP without the APP additive present.

EXAMPLE II

Mixtures of monoammonium orthophosphate (MAP) and urea in various molar ratios as indicated were heated in an oven maintained at a temperature of about 135° C. for about 12 hours in the presence of as well as the absence of substantially water-insoluble ammonium polyphosphate (APP) additive exhibiting crystalline Form 1. The following table sets forth the results.

TABLE 2

| Urea:MAP Ratio | Percent APP Present | Percent Conversion | Percent Solubles [1] |
| --- | --- | --- | --- |
| 1.00 | 0 | 72 | 6.1 |
| 1.20 | 0 | 68 | 7.1 |
| 1.00 | 50.0 | 85 | 3.0 |
| 1.20 | 50.0 | 87 | 3.6 |

[1] Percent solubles in slurry of 10 grams APP in 100 gr. $H_2O$, 1 hour at 25° C.

As can be observed from the above table, the process of the instant invention gave a higher percent of conversion, i.e., a higher yield, and a product containing a much less quantity of the soluble fraction as evidenced by the percent solubles than the process of thermally condensing the urea and MAP without the APP additive present.

EXAMPLE III

Mixtures of monoammonium orthophosphate and urea in a molar ratio of about 1.05:1, respectively, were heated in an oven in the presence of about an equal weight of substantially water-insoluble ammonium polyphosphate (APP) additive exhibiting crystalline Form 2 at various temperatures and for various times as indicated. The following table sets forth the results:

| Oven Temp., ° C. | Time, hrs. | Percent Solubles [1] |
| --- | --- | --- |
| 320 | 0.25 | 1.9 |
|  | 0.50 | 1.0 |
|  | 1.0 | 1.2 |
|  | 2.0 | 2.2 |
|  | 3.5 | 3.1 |
| 275 | 0.25 | 2.4 |
|  | 0.5 | 1.8 |
|  | 1.0 | 1.4 |
|  | 2.0 | 1.4 |
|  | 3.5 | 1.7 |
| 225 | 0.5 | 3.3 |
|  | 2.0 | 2.0 |
|  | 3.5 | 2.2 |
|  | 7.0 | 1.8 |
| 175 | 2.0 | 3.2 |
|  | 3.5 | 2.3 |
|  | 7.0 | 2.8 |

[1] Percent solubles in slurry of 10 grams of APP in 100 gr. $H_2O$, 1 hour at 25° C.

As can be observed from the above table, the process of the instant invention is applicable over a wide range of temperatures and periods of time for the reaction and in each instance gave a substantially water-insoluble crystalline product.

EXAMPLE IV

Into a heavy duty mixer are charged about 700 parts of condensed phosphoric acid (85% $P_2O_5$ by weight), about 359 parts of anhydrous urea, and about 412 parts of monoammonium orthophosphate. The reactants are heated under stirring to about 100° C. forming a relatively clear viscous syrup. The syrup is then blended and heated with about an equal weight of granular substantially water-insoluble ammonium polyphosphate additive exhibiting crystalline Form 2 under an ammonia-rich atmosphere with agitation. The reaction mass begins to give off carbon dioxide and ammonia gas rapidly when the temperature of the mass reaches about 135° C. After further heating under agitation for about 2 hours, the gas evolution ceases and the temperature is raised to about 275° C. for about two hours. Yield of the product, substantially water-insoluble crystalline ammonium polyphosphate (Form 2), is about 1160 parts.

EXAMPLE V

Into a heavy duty mixer are charged about 1000 parts of 85% orthophosphoric acid and about 1020 parts of anhydrous urea. The temperature of the mixture rises to about 45° C. as the materials react. After about 2 hours of mixing, the mass changes from a relatively sticky, taffy-like state to a relatively free-flowing powder of urea-phosphate addition compound. This compound is then blended with about an equal amount of substantially water-insoluble ammonium polyphosphate additive exhibiting crystalline Form 3 and charged to an oven maintained at a temperature of about 350° C. The oven is maintained with an ammonia atmosphere provided by the evolving ammonia gas. After about two hours, the hard dry product is removed and ground. Yield of the product, substantially water-insoluble crystalline ammonium polyphosphate (Form 3), is about 840 parts.

EXAMPLE VI

In a suitable vessel are charged about 1000 parts of 85% orthophosphoric acid and about 1020 parts of anhydrous urea. The temperature of the reactants rises to about 80° C. and the reactants form a homogeneous melt of syrupy consistency. This melt is heated to about 125° C. and then added slowly to a moving bed of substantially water-insoluble ammonium polyphosphate additive exhibiting crystalline Form 2, whose temperature is maintained at about 150 to 200° C. by indirect external heating. After about ½ hour, the charge is transferred to a suitable calciner where it is heated for about 1 hour at about 250° C. under an ammonia-rich atmosphere. Yield of the product, substantially water-insoluble crystalline ammonium polyphosphate (Form 2), is about 840 parts.

EXAMPLE VII

A fluidized bed containing about 700 parts of crystalline ammonium polyphosphate additive (Form 2) of essentially 80 U.S. Standard Mesh is maintained by flowing through a gas mixture of ammonia and carbon dioxide. The fluidized bed is heated externally by a variable electric resistance wire winding around a fluidizer to keep the bed temperature between 220–250° C. The feed material is prepared by melting about 1050 parts of urea and 1000 parts of 85% orthophosphoric acid in a steam-jacketed agitated vessel, and is sprayed onto the bed at a rate of about 120 parts per hour. Under these conditions the feed decomposes rapidly to release the gaseous products of ammonia and carbon dioxide and at the same time the desired crystalline ammonium polyphosphate is formed on the fluidized bed crystals. Entrained particles in the gas are removed by a cyclone for recycling back to the fluidized bed. The gas is then passed to a compressor and a portion of the gas is withdrawn through a bag filter and the ammonia content is recovered by scrubbing with phosphoric acid to form ammonium phosphate. The remainder of the gas is recycled to the fluidizer. The product, substantially water-insoluble ammonium polyphosphate of crystalline Form 2, is withdrawn from the bed at a rate of about 50 parts per hour and allowed to cool to room temperature.

EXAMPLE VIII

Into an indirectly-heated, agitated pressure-vessel, about 170 parts of liquid ammonia is introduced to react with about 800 parts of polyphosphoric acid (88.8 weight percent of $P_2O_5$). The temperature is kept at about 430° C. so that the reaction mass is in a molten stage. The melt is sprayed at a rate of about 60 parts per hour onto an agitated bed made of about 120 parts of substantially water-insoluble crystalline ammonium polyphosphate (Form 2) additive (size less than ¼ inch granules). The bed temperature is kept at about 240° C. by flowing through a stream of ammonia enriched gas which is heated or cooled by a heat exchanger in the recycling loop to maintain the proper heat balance. In the presence of the crystalline ammonium polyphosphate Form 2 additive, the melt crystallizes rapidly to the Form 2 type material and is continuously collected from the discharge end.

EXAMPLE IX

This example illustrates the preparation of a new and novel crystalline form of an ammonium polyphosphate. About 100 parts of a crystalline ammonium polyphosphate (Form 1) is placed in a sealed container and heated at about 275° C. for about 24 hours. Pressure in excess of about 1 atmosphere is bled off. The resulting product has the following crystalline form as evidenced by its X-ray diffraction pattern.

X-RAY DIFFRACTION DATA [1]

(Form 2)

| Line [2]: | d, A. |
|---|---|
| 1 | 5.70 |
| 2 | 6.06 |
| 3 | 3.08 |
| 4 | 2.93 |
| 5 | 3.37 |

[1] CuKα radiation.
[2] Five strongest lines in order of decreasing intensity.

The foregoing prepared ammonium polyphosphate, crystalline Form 2, exhibits the unusual and unexpected properties of being a stable crystalline form at low temperatures, i.e., below about 320° C., without decomposition or deammoniation as well as yielding a very viscous solution when slurried with water although the material is substantially water-insoluble and, therefore, the amount dissolved very small. The foregoing properties can be advantageously used in many applications such as the use of ammonium polyphosphate as a flame retardant in intumescent coatings or plastics or as a builder for anionic or nonionic synthetic detergents, especially built or heavy duty liquid detergents.

EXAMPLE X

This example illustrates the preparation of a new and novel crystalline form of an ammonium polyphosphate. About 100 parts of a crystalline ammonium polyphosphate (Form 1) is placed in a sealed container and heated at about 350° C. for about 1 hour. Pressure in excess of about 1 atmosphere is bled off. The resulting product has the following crystalline form as evidenced by its X-ray diffraction pattern.

X-RAY DIFFRACTION DATA [1]

(Form 3)

| Line [2]: | d, A. |
|---|---|
| 1 | 6.65 |
| 2 | 5.68 |
| 3 | 5.40 |
| 4 | 3.52 |
| 5 | 3.80 |

[1] CuKα radiation.
[2] Five strongest lines in order of decreasing intensity.

The foregoing prepared ammonium polyphosphate, crystalline Form 3, exhibits the unusual and unexpected property of being a stable crystalline form at high temperatures, i.e., about 320–350° C., without decomposition or deammoniation. This product can be advantageously used where a high temperature stable product is either desired or required.

What is claimed is:
1. A process for preparing substantially water-insoluble crystalline ammonium polyphosphates having the general formula:

$$H_{(n-m)+2}(NH_4)_m P_n O_{3n+1}$$

wherein $n$ is an integer having an average value greater than 10 and $m/n$ is between about 0.7 and about 1.1 and the maximum value of $m$ is equal to $n+2$, which comprises thermally condensing an inorganic phosphate containing material capable of yielding a phosphate radical under the conditions specified herein with an inorganic ammoniating agent capable of supplying ammonia under the conditions specified herein and an inorganic condensing agent capable of removing water under the conditions specified herein or a nitrogenous combined ammoniating and condensing agent containing at least one amide group, said ammoniating agent and said phosphate containing material being present in amounts to yield at least about 1 mol of ammonia per mol of phosphorus, in the presence of an additive of said substantially water-insoluble crystalline ammonium polyphosphate, said additive being present in amounts of at least 1 part per 10 parts by weight of the reactants and said thermal condensation conducted at temperatures from about 100° C. to about 350° C. for a sufficient time to convert the reactants to said crystalline ammonium polyphosphates.

2. The process of claim 1, wherein said thermal condensation is conducted at temperatures from about 200° C. to about 300° C.

3. A process for preparing substantially water-insoluble crystalline ammonium polyphosphates having the general formula:

$$H_{(n-m)+2}(NH_4)_m P_n O_{3n+1}$$

wherein $n$ is an integer having an average value greater than 10 and $m/n$ is between about 0.7 and about 1.1 and the maximum value of $m$ is equal to $n+2$, which comprises thermally condensing a composition comprised of a nitrogeneous combined ammoniating and condensing agent containing at least one amide group and a phosphate containing material selected from the group consisting of ammonium orthophosphates, orthophosphoric acid, condensed phosphoric acid and mixtures thereof said combined ammoniating and condensing agent and said phosphate containing material being present in amounts to yield at least about one mol of ammonia per mol of phosphorus, in the presence of an additive of said substantially water-insoluble crystalline ammonium polyphosphate, said additive being present in amounts of at least 1 part per 10 parts by weight of said composition and said thermal condensation conducted at temperatures from about 100° C. to about 350° C. for a sufficient time to convert said composition to said crystalline ammonium polyphosphates.

4. The process of claim 3, wherein said combined ammoniating and condensing agent is urea.

5. The process of claim 4, wherein said thermal condensation is conducted at temperatures from about 200° C. to about 300° C.

6. The process of claim 4, wherein said additive is present on a weight ratio basis of additive to composition of from about 1:10 to 2:1.

7. The process of claim 4, wherein said additive is present on a weight ratio basis of additive to composition of from about 20:1 to about 50:1.

8. The process of claim 4, wherein said phosphate containing material is an ammonium orthophosphate.

9. The process of claim 4, wherein said phosphate containing material is orthophosphoric acid.

10. The process of claim 4, wherein said phosphate containing material is condensed phosphoric acid.

11. A process for preparing substantially water-insoluble crystalline ammonium polyphosphates having the general formula:

$$H_{(n-m)+2}(NH_4)_m P_n O_{3n+1}$$

wherein $n$ is an integer having an average value greater than 10 and $m/n$ is between about 0.7 and 1.1, and the maximum value of $m$ is equal to $n+2$, which comprises thermally condensing, as reactants, monoammonium orthophosphate and urea, in a molar ratio of between about 1:1 to about 1:7, respectively, in the presence of an additive of said substantially water-insoluble crystalline ammonium polyphosphate, said additive being present in amounts on a weight ratio basis of additive to reactants of from about 1:10 to 2:1 and said thermal condensation conducted at temperatures from about 200° C. to about 300° C. and under an ammonia atmosphere for a sufficient time to convert said reactants to said crystalline ammonium polyphosphates.

12. The process of claim 11, wherein said ammonium polyphosphate is of crystalline Form 1 exhibiting the following X-ray diffraction data:

| Line: | $d$, A. |
|---|---|
| 1 | 6.06 |
| 2 | 5.47 |
| 3 | 3.83 |
| 4 | 3.50 |
| 5 | 3.24 |

13. The process of claim 11, wherein said ammonium polyphosphate is of crystalline Form 2 exhibiting the following X-ray diffraction data:

| Line: | $d$, A. |
|---|---|
| 1 | 5.70 |
| 2 | 6.06 |
| 3 | 3.08 |
| 4 | 2.93 |
| 5 | 3.37 |

14. A process for preparing substantially water-insoluble crystalline ammonium polyphosphate having the general formula:

$$H_{(n-m)+2}(NH_4)_m P_n O_{3n+1}$$

wherein $n$ is an integer having an average value greater than 10 and $m/n$ is between about 0.7 to about 1.1 and the maximum value of $m$ is equal to $n+2$, which comprises thermally condensing, as reactants, orthophosphoric acid and urea, in a molar ratio of from about 1:1 to about 1:5, respectively, in the presence of an additive of said substantially water-insoluble crystalline ammonium polyphosphate, said additive being present in amounts or a weight ratio base of additive to reactants of from about 20:1 to about 50:1 and said thermal condensation conducted by heating said reactions until a melt is formed, spraying said melt on a bed of said additive and thereafter calcining said additive and said reactants at temperatures from about 200° C. to about 300° C. under an atmosphere of ammonia for a sufficient time to convert said reactants to said crystalline ammonium polyphosphates.

15. The process of claim 14, wherein said ammonium polyphosphate is of crystalline Form 1 and exhibiting the following X-ray diffraction data:

| Line: | $d$, A. |
|---|---|
| 1 | 6.06 |
| 2 | 5.47 |
| 3 | 3.83 |
| 4 | 3.50 |
| 5 | 3.24 |

16. The process of claim 14, wherein said ammonium polyphosphate is of crystalline Form 2 and exhibiting the following X-ray diffraction data:

| Line: | $d$, A. |
|---|---|
| 1 | 5.70 |
| 2 | 6.06 |
| 3 | 3.08 |
| 4 | 2.93 |
| 5 | 3.37 |

17. A substantially water-insoluble ammonium polyphospate of crystalline Form 2 having the general formula:

$$H_{(n-m)+2}(NH_4)_m P_n O_{3n+1}$$

wherein $n$ is an integer having an average value greater than 10 and $m/n$ is between about 0.7 and about 1.1 and the maximum value of $m$ is equal to $n+2$, said crystalline form exhibiting the following X-ray diffraction data:

| Line: | $d$, A. |
|---|---|
| 1 | 5.70 |
| 2 | 6.06 |
| 3 | 3.08 |
| 4 | 2.93 |
| 5 | 3.37 |

18. A substantially water-insoluble ammonium polyphosphate of crystalline Form 3 having the general formula:

$$H_{(n-m)+2}(NH_4)_m P_n O_{3n+1}$$

wherein $n$ is an integer having an average value greater than 10 and $m/n$ is between about 0.7 and about 1.1 and the maximum value of $m$ is equal to $n+2$, said crystalline form exhibiting the following X-ray diffraction data:

| Line: | $d$, A. |
|---|---|
| 1 | 6.65 |
| 2 | 5.68 |
| 3 | 5.40 |
| 4 | 3.52 |
| 5 | 3.80 |

References Cited

UNITED STATES PATENTS 2,962,354  11/1960  Edwards _____ 23—106

FOREIGN PATENTS 6,403,344  9/1964  Netherlands.

OSCAR R. VERTIZ, *Primary Examiner.*

L. A. MARSH, *Assistant Examiner.*